United States Patent [19]

Hayes

[11] Patent Number: 4,602,507
[45] Date of Patent: Jul. 29, 1986

[54] APPARATUS FOR MONITORING AND VISUALLY DISPLAYING THE OPERATION OF AN INTERNAL COMBUSTION ENGINE

[76] Inventor: Harold D. Hayes, 1104 E. Oregon, Phoenix, Ariz. 85014

[21] Appl. No.: 725,083

[22] Filed: Apr. 19, 1985

[51] Int. Cl.[4] .......................................... G01M 15/00
[52] U.S. Cl. .................................................. 73/117.3
[58] Field of Search .............. 73/116, 117.3; 324/378, 324/385, 395, 402

[56] References Cited

U.S. PATENT DOCUMENTS

2,057,968 10/1936 Paxton ........................... 324/395 X
4,008,430 2/1977 Blum .................................. 324/402

Primary Examiner—Jerry W. Myracle
Attorney, Agent, or Firm—Herbert E. Haynes, Jr.

[57] ABSTRACT

An apparatus for detecting a misfiring condition in an internal combustion engine by monitoring the acoustic pressure wave in the engine's exhaust system and producing a visual indication of each occurrence of combustion in the engine, or by monitoring the ignition system of a spark-ignition type of engine and producing a visual indication of each occurrence of an ignition spark in the engine.

20 Claims, 9 Drawing Figures

APPARATUS FOR MONITORING AND VISUALLY DISPLAYING THE OPERATION OF AN INTERNAL COMBUSTION ENGINE

BACKGROUND OF THE INVENTION

1. Field of the Invention

The present invention relates in general to automotive equipment and more particularly to an apparatus for monitoring the operation of an internal combustion engine and providing a visual display indicative of the engine operation.

2. Description of the Prior Art

Misfiring in many of todays internal combustion engines is difficult to detect, particularly for an average operator, and when detected, it can be difficult to locate the particular malfunctioning cylinder. In addition to the well known loss of engine performance and a deterioration of the fuel consumption rate in an engine which is misfiring, heat related damage can result.

In most modern internal combustion engines, a catalytic converter is used in the exhaust system for re-oxidation of combustible residues, and catalytic converters normally operate at high temperatures. When an internal combustion engine is operating in a misfiring condition, the temperature in the exhaust system increases a considerable amount above normal and such an increase of the already normally high temperature within the catalytic converter can result in burning of the catalyst.

Therefore, some method for detecting an engine misfiring condition must be employed so that corrective action can be taken before heat related damage can occur and to restore the engine to its normal fuel consumption rate and normal performance, and various methods have been proposed for this purpose.

One of these proposed methods is to monitor the electric waveform in the primary circuit, or secondary circuit, of the ignition coil of an engine. This method is not completely satisfactory, however, in that it only monitors the ignition system of the engine and misfires in a spark-ignition internal combustion engine can be caused by other factors of the engine such as an improper fuel-air mixture, a blocked fuel injector, and the like.

Another prior art method of detecting an engine misfire is to measure the temperature of the exhaust gasses being discharged from each individual cylinder of the engine and comparing these multiple temperature values with each other to detect an unusual temperature level resulting from a misfiring condition. The primary drawback with this method is that extremely complicated and costly mechanical and electrical components are required to achieve satisfactory results.

Still another method for detecting internal combustion engine misfiring is to monitor the amount of air in the exhaust gases for detecting a lack of combustion in any of the cylinders. The amount of air in exhaust gases will, of course, increase when an engine misfires as a result of the absence of combustion with a particular cylinder, or cylinders, and the increase in air concentration is sensed by an oxygen sensor located in the exhaust system. An oxygen sensor is a device which produces an electric signal that is indicative of the air concentration in the exhaust gases which pass through the sensor. The output signal from an oxygen sensor is substantially constant except when the concentration of oxygen contained in the exhaust gas assumes a certain value such as that which corresponds to the stoichiometric air-to-fuel ratio of the fuel air mixture in the fuel supply system of the engine. Thus, an oxygen sensor is unable to continuously and faithfully follow the air concentrations in exhaust gases in an analog fashion and therefore, cannot distinguish between a misfiring condition and a condition wherein an overly lean fuel mixture is combusted in an engine.

A particular prior art engine misfire detection system is disclosed in U.S. Pat. No. 4,083,234 wherein an electroacoustic transducer is provided to sense exhaust noises of an internal combustion engine and produce a continuous electric signal wave. The signal produced by the transducer has peak values appearing at a fundamental frequency irrespective of the engines firing condition and other values which occur at fractional harmonic frequencies when the engine misfires. The output signal wave of the transducer is amplified and coupled to a frequency analyzer. Another signal is provided by a frequency generator which senses engine speed and its signal is indicative of engine speed and that signal is also coupled to the frequency analyzer. The frequency analyzer modifies the signal wave received from the transducer in accordance with the engine speed signal received from the frequency generator and analyzes the fundamental frequency component of the wave and the fractional harmonics thereof to establish a relationship between the spectrum amplitudes of those signal wave components. The fractional harmonics of the signal wave are added together to produce a composite signal and a misfire signal is produced by the frequency analyzer when the spectrum density level of the composite signal becomes greater than the spectrum density level of the fundamental frequency component of the signal wave produced by the transducer. The misfire signal produced by the frequency analyzer is connected to a suitable control circuit which is operative to remedy the malfunctioning of the fuel supply system and/or the ignition system whichever caused the misfire.

As will be appreciated from the brief description presented immediately above with regard to the particular prior art misfire detection system, the system is completely automatic and as a result the vehicle's operator is left completely out of the detection and correction functions of the system. In order to accomplish the objectives of such a fully automated systems, the system itself is very complex and costly. Further, as is well known, not all engine malfunctions can be remedied by simple adjustments and therefore a control circuit cannot possibly correct everything within an engine that can cause a misfire. In addition, this particular prior art system makes no provisions for locating the particular cylinder which is misfiring, all it produces is a signal indicative of the presence of a misfire. Therefore, even if the vehicle's operator becomes aware of the misfire condition, the detection and correction system will not help the operator in locating the source of the problem.

Therefore, a need exists for a new and improved engine misfire detection system which overcomes some of the problems and shortcomings of the prior art.

SUMMARY OF THE INVENTION

In accordance with the present invention, new and improved apparatuses are disclosed for monitoring the operation of an internal combustion engine and providing a visual indication of the engines operation.

In a first embodiment of the present invention, an apparatus is provided for periodically checking for a misfire condition in an internal combustion engine either during regular maintenance or whenever such a condition is suspected. This apparatus is intended to be an analysis tool rather than an on-board continuously operating device. An electroacoustic transducer, such as a conventional microphone, is positioned proximate the outlet end of the tail pipe of the engine's exhaust system so as to sense the acoustical pressure waves, as they exit the exhaust system. In response to the sensed acoustical pressure waves, the transducer produces an electric signal indicative of the pressure waves and that electric signal is amplified and coupled to a threshold circuit means.

The acoustical pressure wave, and thus the electric signal produced by the transducer, is in the form of a pulse train having high amplitude pulses representative of each occurrence of combustion within the engine, and low amplitude pulses, or noise between each of the high amplitude pulses.

The threshold circuit means is operative to eliminate the low amplitude pulses from the electric signal and pass only the high amplitude pulses. Therefore, the output signal from the threshold circuit means is a pulse train made up of pulses which are indicative of each occurrence of combustion in the engine, and that signal is coupled to an indicator light, such as a light emitting diode (L.E.D.) to illuminate the light at each occurrence of a pulse in the signal. The indicator light is mounted on a rotating disc so that the light is rotatably driven in a circular path. Rotational driving of the disc is accomplished by a variable speed DC motor having the disc mounted on its output shaft. The speed of the motor is controlled, such as by means of a rheostat located in its power supply line, so that rotational speed of the disc can be synchronized to match the RPM of the engine.

When a normally running engine is being analyzed and the rotational speed of the disc has been synchronized to match the engines RPM, the indicator light will be illuminated at a plurality of distinct locations on the circular path of the light. More specifically, the light will be lit at four places for a four cylinder engine, six places for a six cylinder engine and eight places for an eight cylinder engine. When one of the cylinders of the engine being analyzed is misfiring, the pulse of the signal which would otherwise be indicative of combustion in the misfired cylinder will be missing from the pulse train and thus the indicator light will not be illuminated at one of the locations on the circular path of the light. When such a misfiring is detected in this manner, the specific cylinder causing the problem can be located by disconnecting the spark plug wires one at a time.

The above described first embodiment of the present invention can be modified to provide selective means for analyzing the ignition system of the engine. A temporary connection is made to either the primary circuit or the secondary circuit of the engine's ignition system to sense the electric signal present in the system. The sensed signal is in the form of a pulse train, and that signal is selectively directed via a switch to the input of the above described threshold circuit and, in the above described manner, it is employed for illumination of the indicator light.

The above described first embodiment of the present invention can be modified to change it from a selectively used analyzing tool into an on-board continuously operating engine monitoring device. In this modification, the electroacoustic transducer is permanently mounted in an appropriate location in the engine's exhaust system and rotational driving of the disc is accomplished by a drive means which is coupled between the engine itself and the disc. The drive means can, for example, be a simple drive cable, such as a speedometer cable, that is connected between any rotating component of the engine or drive train, and the rotating disc. However, it is preferred that a synchronous drive means be employed. This can be accomplished by coupling a synchro generator to, for example, the engine's cam shaft so that the synchro generator produces an electric signal indicative of the rotational input to the synchro generator. The electric signal produced by the synchro generator is coupled to the input of a synchro motor for driving the output shaft thereof in precise synchronization with the rotational input to the synchro generator. By mounting the hereinbefore described disc on the output shaft of the synchro motor, the rotational speed on the disc will automatically be synchronized with the engine's RPM.

By mounting the rotating disc either in the dashboard of the vehicle, or elsewhere in the operator's field of vision, the above described modified form of the first embodiment of the present invention can be employed as an on-board engine monitoring apparatus for detecting engine misfiring and, if desired, for selective testing of the engine's ignition system in the hereinbefore described manner.

In a second embodiment of the present invention, a completely electronic system is disclosed in place of the above described electro-mechanical device. In this second embodiment, which is intended for use as an on-board engine monitoring system, an encoder means, such as optical, is coupled for rotational driving by, for example, the engine's cam shaft to provide a single timing pulse per revolution of the cam shaft and simultaneously provide a multiplicity of counter pulses. The timing pulse and counter pulses are directed to a display control circuit which also receives the pulse train produced by the electroacoustic transducer which is amplified and passed through the threshold circuit means in the manner hereinbefore described with reference to the first embodiment of the present invention. In this manner, the above mentioned display control circuit receives three separate signals, e.g., the timing pulse and the counter pulses from the optical encoder and the pulse train indicative of the acoustical pressure wave of the engine's exhaust system.

The timing pulse received in the display control circuit is coupled for resetting of an electronic counter, and the counter pulses are coupled to the electronic counter so as to sequentially trigger a multiplicity of output signals in timed relationship with engine RPM. Each of the multiplicity of output signals from the electronic counter are coupled to different ones of a plurality of driver means, and the pulse train produced by the electroacoustic transducer is coupled to each of the driver means. In this way, the driver means will be sequentially rendered conductive when both a pulse of the electroacoustic pulse train and the pulse from the electronic counter are simultaneously presented thereon. The output of each of the individual drive means are coupled to different ones of a plurality of indicator lights provided in an optical dipslay module so as to sequentially illuminate those indicator lights. The indicator lights are preferably arranged in a circular array with the number of lights matching the number of driver means and the number of counter pulses produced by the optical encoder. It is preferred that the number of lights be considerably more than the number of cylinders of the engine being monitored so that light intensity will increase and subsequently attenuate in each sector of the circular array that is indicative of the occurrence of combustion in each cylinder of the engine being monitored. In this manner, other conditions, such as proper operation of the spark advance device, an open or shorted circuit in the ignition system, and the like, will be indicated on the optical display module. In addition, means may be provided for selective monitoring of the engine's ignition system in the hereinbefore described manner.

Accordingly, new and improved apparatuses are provided for monitoring the operation of an internal combustion engine and providing a visual indication of the engine's operation.

Another object of the present invention is to provide new and improved apparatuses for monitoring the operation of an internal combustion engine for detection of a misfiring condition of the engine and having means for providing a visual display indicative of the engine's operation.

Another object of the present invention is to provide an apparatus of the above described character wherein the engine's operation is monitored by an electroacoustical transducer which produces an electric signal pulse train indicative of each occurrence of combustion in the engine with the pulse train being employed to operate a visual display device.

Another object of the present invention is to provide an apparatus of the above described character wherein the apparatus may be configured to selectively monitor an engine's ignition system in addition to monitoring the engine for detection of a misfiring condition.

Still another object of the present invention is to provide an apparatus of the above described type wherein the apparatus may be configured either as an engine analyzing tool for selective use during routine maintenance or whenever an engine operation problem is suspected, or as an apparatus which is mounted onboard a vehicle and employed to continuously monitor the engine's operation and provide the visual display within the vehicle operations normal field of vision.

Yet another object of the present invention is to provide an apparatus of the above described character which may be configured in the form of an electromechanical mechanism or in the form of a solid state electronic mechanism, as desired.

The foregoing and other objects of the present invention as well as the invention itself, may be more fully understood from the following description when read in conjunction with the accompanying drawings.

DESCRIPTION OF THE PREFERRED EMBODIMENTS

Figure 1:
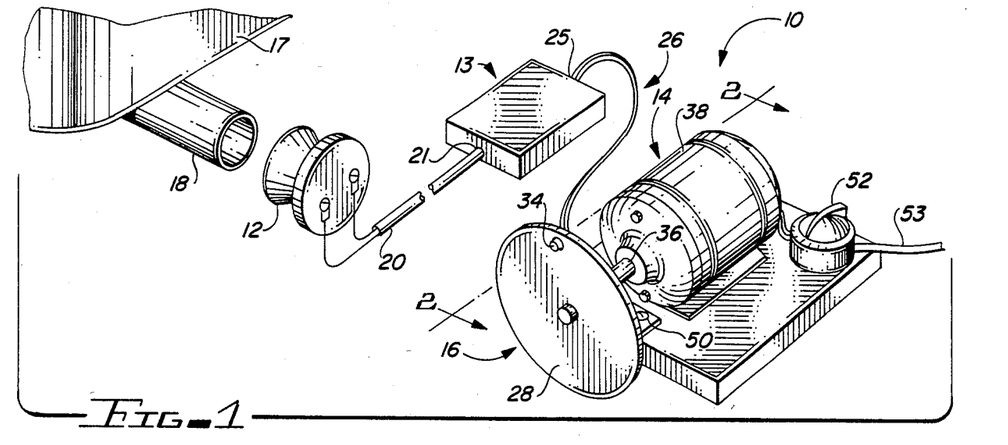
FIG. 1 is a perspective view showing the various components and structural features of a first embodiment of the apparatus of the present invention.
Figure 2:
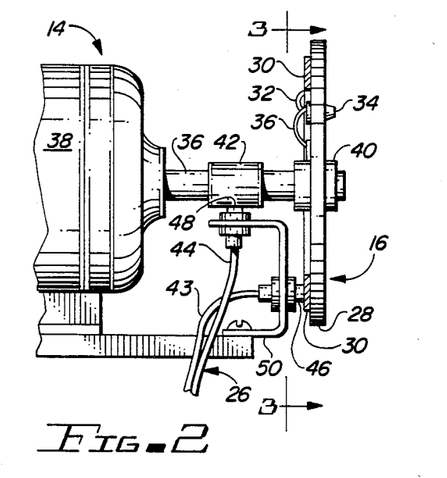
FIG. 2 is an enlarged fragmentary side elevational view taken along the line 2—2 of FIG. 1.
Figure 3:
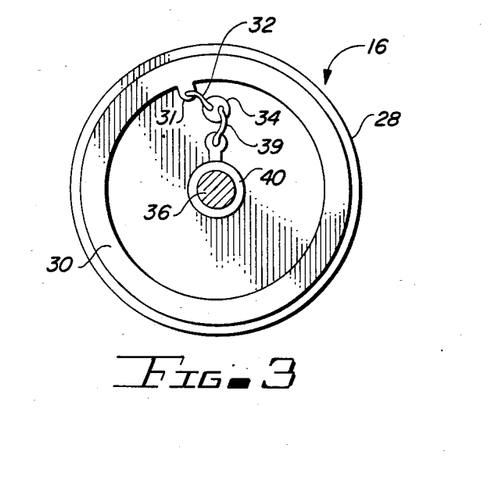
FIG. 3 is an enlarged sectional view taken along the line 3—3 of FIG. 2.

Referring more particularly to the drawings, FIGS. 1, 2 and 3 show a first embodiment of the apparatus of the present invention with the appartaus being indicated in its entirety by the reference numeral 10. As will hereinafter be described in detail, the apparatus 10 includes the major components of an electroacoustic transducer 12, an electric circuit means 13, a synchronization means 14, and a visual display device 16. Also shown in FIG. 1, is a fragmentary portion of an automotive vehicle 17 having the usual exhaust pipe 18.

Figure 5:
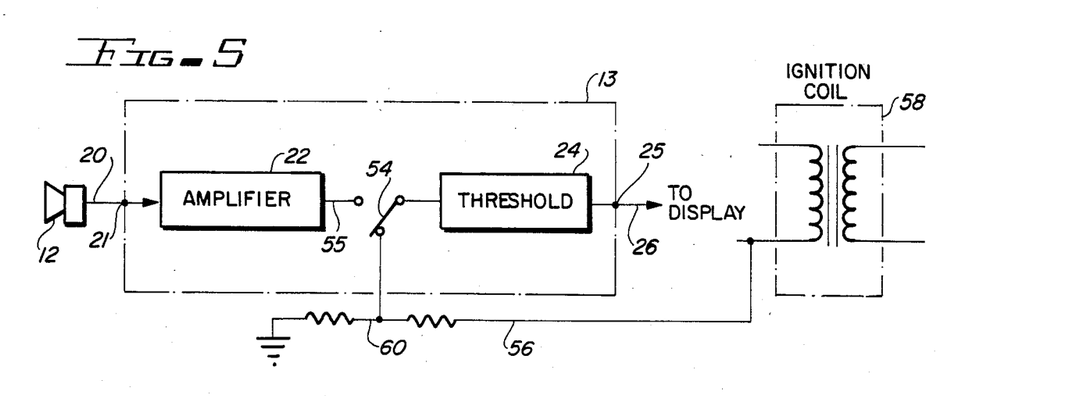
FIG. 5 is a schematic-type diagram illustrating the electrical connections of the first embodiment of the apparatus of the present invention and of the modified form shown in FIG. 4.

The electroacoustic transducer 12, in the illustrated form of a microphone, is placed proximate the outlet end of the exhaust pipe 18 for reasons which will become apparent as this description progresses. In this position, the transducer 12 will sense the acoustic pressure wave being emitted from the exhaust pipe 18 and will respond by producing an electric signal indicative of the sensed acoustic pressure wave. The acoustic pressure wave, and thus the signal produced by the transducer 12, will consist of a plurality of spaced apart high amplitude pulses indicative of the occurrence of each combustion within the engine being monitored (not shown). The high amplitude pulses are each separated by a plurality of spurious low amplitude pulses, or noise. The electric signal wave produced by the transducer 12 is coupled by suitable conductors 20 to the input 21 of the electric circuit means 13. The circuit means 13, as shown in FIG. 5, contains an amplifier circuit 22 and a threshold circuit 24.

As is well known in the art, an amplifier circuit is used to increase the strength of an electric signal and a threshold circuit is employed to pass only those portions of an electric signal which are above a predetermined value. Both amplifier and threshold circuits are old in the art and well known, and therefore, are not shown or described in detail herein.

The electric signal pulse train produced by the transducer 12 is amplified in the amplifier circuit 22 and the relatively low amplitude spurious pulses are shunted to ground in the threshold circuit 24. Thus, the output of the electric circuit means 13 will be in the form of a pulse train with each pulse being indicative of a different occurrence of combustion within the engine (not shown), and that electric pulse train, hereinafter referred to as the electroacoustic pulse train, is coupled from the outlet 25 of the electric circuit means 13 by a suitable conductor 26 to the visual display 16.

The visual display device 16 includes a disc 28 formed of a suitable dielectric material and having a circular ring 30 on one of the planar surfaces thereof. The ring 30 is formed of an electrically conductive material, such as copper, and is plated, or otherwise formed on the disc in, for example, the manner well known in the circuit board art. The conductive ring 30 has a conductive pad 31 which is coupled by a suitable wire 32 to a first terminal of an indicator light 34 that is mounted in the disc. As will hereinafter be described in detail, the disc 28 is mounted on the output shaft 36 of a motor 38 for rotational driving of the disc. The other terminal of the indicator light 34 is coupled by means of a suitable conductive wire 39 to a metallic hub 40 provided on the disc 28. The metallic hub 40, by virtue of its being mounted on the motor shaft 36, is in conductive contact with the shaft which has a slip ring 42 mounted thereon.

The conductor 26 leading from the electric circuit means 13 to the visual display device 16, as best seen in FIG. 2, includes a conductor wire 43 and a ground wire 44. The conductor wire 43 is connected to a first contact means 46 and the ground wire 44 is similarly connected to a second contact means 48. The first and second contact means 46 and 48 are supported by a suitable bracket means 50 so that the first contact means 46 is in sliding electrically conductive contact with the conductive ring 30 of the disc 28, and the second contact means 48 is in sliding electrically conductive contact with the slip ring 42 that is carried on the output shaft 36 of the motor 38.

Therefore, the indicator light 34, which is preferably a light emitting diode (L.E.D.), will be illuminated each time an individual pulse of the electroacoustic pulse train is applied to the indicator light 34 in the above described manner.

If the disc 28 is held stationary, e.g., not rotatably driven, the result would be that the indicator light 34 would cycle between off and on states, and this would not provide much of an indication of the operating condition of the engine being monitored by an observer. Similarly, if the disc 28 were to be rotatably driven at a random speed which is asynchronous with respect to the RPM of the engine that is being being monitored, the rotating light 34 would appear as a blinking ring of light. Therefore, the above mentioned synchronization means 14 is provided.

The synchronization means 14 of this embodiment of the present invention includes the hereinbefore mentioned motor 38 which is a variable speed DC motor having input voltage adjusting means 52, such as a rheostat, in its power supply line 53. When the rotational speed of the motor 38 is adjusted to match the RPM of the engine being monitored, the indicator light 34 will be repeatedly illuminated in the specific sectors of the circular path through which it is moved. It is to be understood that the number of sectors is determined by the number of cylinders of the engine being monitored. That is, a four cylinder engine will illuminate the indicator light 34 four times for each revolution of the disc 28, a six cylinder engine will illuminate the light six times per revolution, and an eight cylinder engine will illuminate the light 34 eight times per disc revolution.

In a normally running engine, four cylinder for example, each time combustion occurs in cylinder No. 1, the light 34 will be lit at a specific place in the rotational path of the light, each time combustion occurs in cylinder No. 2, the light 34 will be lit in a different specific location on the rotational path, and so forth, In the event of an engine misfire, one or more of the specific locations of the light illumination will be dark, thus providing a visual indication that one or more of the cylinders of the engine being monitored is misfiring. In order to identify which one, or ones, of the cylinders are misfiring, the spark plug wires (not shown) of the engine can be sequentially disconnected and reconnected.

As shown schematically in FIG. 5, the above described apparatus 10 can be modified to provide means for specifically monitoring the ignition system of the engine being monitored, in addition to the above described misfire detection capability. It is to be understood that the apparatus 10 may be used for monitoring either spark-ignition or diesel engines. However, the modification of FIG. 5 is limited for use with spark-ignition types of engines. To accomplish this, a selector switch 54 is provided in the electric circuit means 13 so as to be in the conductor 55 leading from the amplifier circuit 22 to the threshold circuit 24. In a first position (not shown) of the selector switch 54, the apparatus 10 will operate in the hereinbefore described manner for detecting a misfiring condition in the engine being monitored. In the illustrated second position of the switch 54, the electroacoustic pulse train is disconnected, and the ignition system pulse train is directed into the threshold circuit 24 through the switch 54. To provide the ignition system pulse train, a wire 56 is connected to either the primary circuit or the secondary circuit of the ignition system of the engine being monitored. This may be accomplished by making the connection to the ignition coil 58 as indicated in FIG. 5. When connected in this manner, a pulse train indicative of each occurrence of a spark in the ignition system of the engine being monitored will be transmitted over the wire 56 through a suitable voltage divider circuit 60, for dropping the voltage to a suitable value, to the proper terminal of the selector switch.

From the above, it will be apparent that the apparatus 10, either with or without the modification shown in FIG. 5, is intended to be used as a piece of test equipment for use during regular maintenance or whenever a misfiring condition is suspected in an engine. The need for manually synchronizing the rotational speed of the disc to match the engine RPM makes it impossible, or at least difficult, to use the apparatus 10 in any situation where the engine RPM will vary, as it will do in normal driving of any vehicle.

The apparatus 10 can, however, be provided with a more sophisticated synchronizing means to automatically and continuously adjust the rotational speed of the disc 28 to suit the various RPMs of an engine being monitored. A more sophisticated synchronizing means will allow the modified apparatus to be permanently installed in a motor vehicle for continuously monitoring, and visually displaying the operating condition, of the vehicle's engine during operation of the vehicle.

Figure 4:
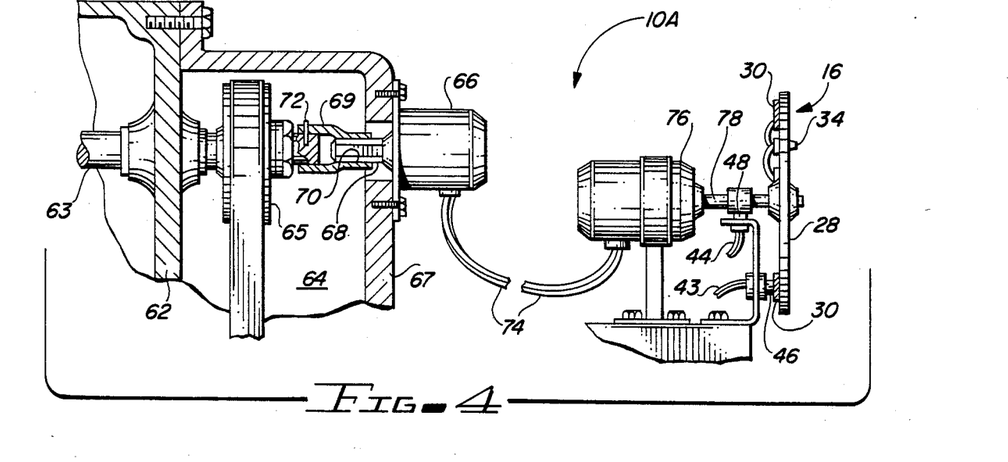
FIG. 4 is a fragmentary side elevational view of a modified form of the apparatus of FIG. 1.

Reference is now made to FIG. 4 wherein a modified form of the above described apparatus 10 is illustrated, with the modified apparatus being indicated generally by the reference numeral 10a. A fragmentary part of an engine 62 is shown in FIG. 4 with the forward end of a cam shaft 63 extending into the timing chamber 64 and having a timing and drive pulley 65 thereon. In accordance with this embodiment of the invention, a synchro generator 66 is mounted on the timing chamber cover 67 of the engine and the input shaft 68 of the generator 66 is coupled to the front end of the cam shaft 63. The coupling is preferably accomplished by a shear means such as the illustrated sleeve 69 having an internally splined end 70 for receiving the input shaft 68 of the generator. The opposite end of the sleeve has a smooth bore for receiving the cam shaft 63 and a shear pin 72 is used to fix the sleeve to the cam shaft. Thus, when the engine is being operated, rotational of the cam shaft 63 results in rotational input to the synchro generator 66 which produces an electric signal output indicative of the rotational position of the cam shaft. The signal from the synchro generator 66 is coupled by suitable conductors 74 to a sychro motor 76 which, as is well known, will operate in response to the received signal to rotate its output shaft 78 at the same speed as the input shaft 68 of the synchro generator 66.

The hereinbefore described visual display device 16 is carried on the output shaft 78 of the synchro motor 76, and operates in the manner described above to respond to the electroacoustic signal, or the ignition system pulse, by illumination of the indicator light 34.

It is to be understood that the illustrated and above described specific mounting arrangement of the synchro generator 66 is not critical to the present invention in that the generator could just as well be coupled to other rotating parts of the engine such as the crank shaft (not shown), or the like. Also, the same objective of automatic and continuous synchronous driving of the visual indicator 16 could be accomplished by other synchronizing devices such as a cable (not shown) which could be connected to the vehicle and operate in the manner of the well known speedometer cable (not shown).

Figures 6, 7:
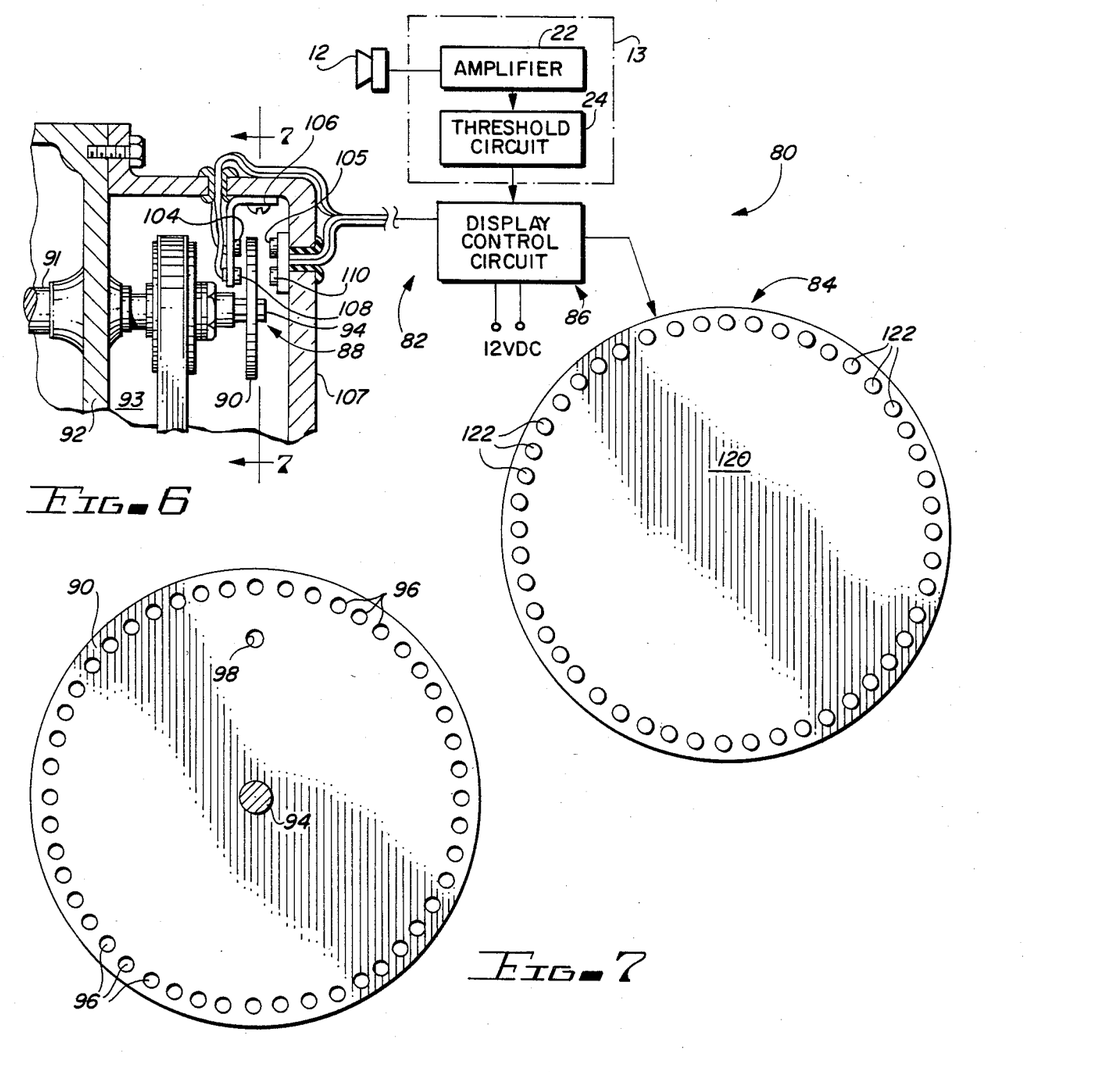
FIG. 6 is a fragmentary side elevational view, partially in block diagram form, illustrating a second embodiment of the apparatus of the present invention.
FIG. 7 is a fragmentary sectional view taken along the line 7—7 of FIG. 6.
Figure 8:
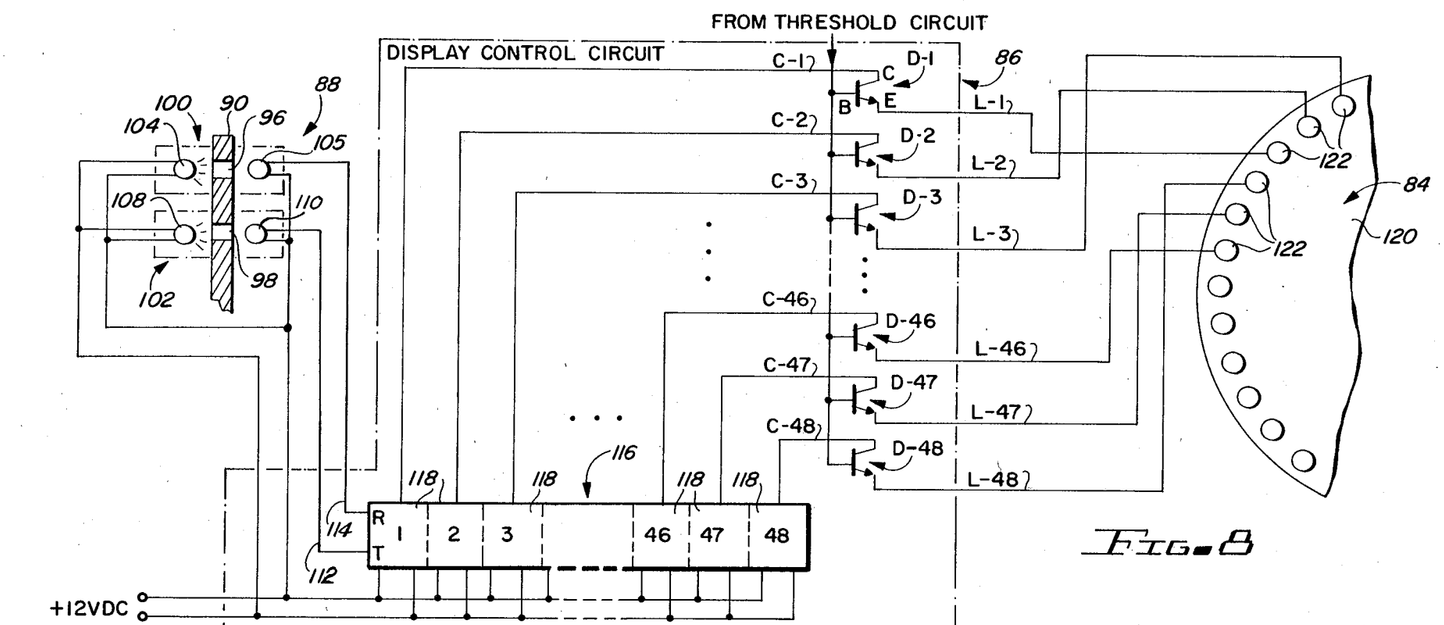
FIG. 8 is a schematic diagram of the apparatus shown in FIG. 6.

Reference is now made to FIGS. 6, 7 and 8 wherein a second embodiment o the present invention is illustrated. In this embodiment, the apparatus for monitoring engine operation and providing a visual display of the operating condition of the engine, is indicated generally by the reference numeral 80. The apparatus 80, as will become apparent as this description progresses, is an all electronic apparatus, as opposed to the electro-mechanical device of the hereinbefore described first embodiment. However, the apparatus 80 includes elements which accomplish similar functions and those elements include the electroacoustic transducer 12, the electric circuit means 13, which contains the amplifier circuit 22 and the threshold circuit 24, a synchronization means 82 and a visual display device 84.

The electroacoustic transducer 12, the amplifier circuit 22 and the threshold circuit 24 operate as hereinbefore described to provide the electroacoustic pulse train which, in this embodiment is supplied to a display control circuit means 86 of the synchronization means 82.

In addition to the display control circuit means 86, the synchronization means 82 includes an encoder means 88. The encoder means 88 is shown as an optical encoder but it should be understood that a magnetical encoder could be employed as an alternative. The optical encoder 88 includes a disc 90 that is suitably mounted for rotation with the cam shaft 91 of the engine 92. The disc 90 is located in the timing chamber 93 and is attached to the end of the cam shaft 91 such as by means of a screw 94. The disc 90, as seen best in FIG. 7, is formed with a plurality of apertures 96 arranged in a circular array and these apertures will hereinafter be referred to as the counter apertures for reasons which will become apparent as this description progresses. In the illustrated embodiment, it will be noted that there are forty-eight of these counter apertures. In addition to the counter apertures 96, a single timing aperture 98 is also formed in the disc. Alternatively, the pulley 99 of the cam shaft 91 could be provided with the above mentioned apertures 96 and 98 to eliminate the need for the disc 90.

The optical encoder means 88 further includes a pair of optical sensing means 100 and 102. The first optical sensing means 100 includes a light emitting device 104 on one side of the disc 90 and a photo-sensitive device 105 on the opposite side thereof. The light emitting device 104, which is suitably mounted on a bracket 106, and the photo-sensitive device 105 which may be mounted directly on the inner surface of the engine's timing cover 107, are disposed so as to be in alignment with each other and with the circular array of counter apertures 96 formed through the disc. The second optical sensing means 102 similarly includes a light emitting device 108 and a photo-sensitive device 110 mounted on opposite sides of the disc 90, such as on the bracket 106 and on the inner surfaces of the timing cover 107. The light emitting device 108 and the photo-sensitive device 110 are in alignment with each other and with the single timing aperture 989 formed through the disc 90.

As is well known, when radiation from a light emitting device impinges on a photo-sensitive device, the photo-sensitive device will produce an output signal. Therefore, when the disc 90 is being rotatably driven by the engine, the photo-sensitive device 105 of the first optical sensing means 100 will produce a pulse each time one of the counter apertures 96 passes between the light emitting device 104 and the photo-sensitive device. Due to the multiplicity of counter apertures 96, the output signal from the first optical sensing means will be in the form of a pulse train having a frequency determined by the rotational speed of the disc, and that pulse train is hereinafter referred to as the counter pulse signal and that pulse train will contain forty-eight individual pulses per revolution of the disc 90. Similarly, the output signal from the second optical sensing means 102 will produce a single timing pulse per revolution of the disc 90 and that signal is hereinafter referred to as the timing pulse signal. The counter pulse signal is transmitted over a conductor 112 to the display control circuit 86 and the timing pulse signal is transmitted over a conductor 114 to the control circuit 86.

As seen in FIG. 8, the display control circuit 86 is provided with an electronic counter means 116 which includes a plurality of monostable multivibrators 118 which, in the illustrated embodiment are forty-eight in number so as to be equal in number to the number of counter pulses 96 formed in the disc 90. For convenience of this description, the monostable multivibrators 118 are individually numbered from 1 to 48.

The timing pulse signal transmitted over conductor 114 is supplied to the reset terminal (R) of the counter means 116 and the counter pulse signal is applied by conductor 112 to the trigger terminal (T) of the counter means. As is well known, when a signal is applied to the reset terminal (R) of an electronic counter device, it will react by clearing the count in the device so that subsequent triggering will start the count at 1. Therefore, after being reset, receipt of the first subsequent counter pulse will trigger monostable multivibrator No. 1 so that it will produce an output signal for a predetermined length of time, and that output signal is applied for transmission over conductor C-1 as will hereinafter be described in detail. Receipt of the next subsequent counter pulse signal will trigger monostable multivibrator No. 2 so that it will produce an output signal for a predetermined time and that output signal is transmitted over conductor C-2. In this manner, each subsequently received counter pulse of the counter pulse signal will sequentially trigger the next one of the monostable multivibrators 118. When the forty-eighth pulse of the counter pulse signal is received, it will trigger monostable multivibrator No. 48 so that its output signal will be presented for transmission over conductor C-48. When monostable multivibrator No. 48 has been triggered, the timing pulse signal will be received at the reset terminal (R) and the electronic counter means 116 will be reset and the counting function will start all over again.

From the above, it will be seen that the monostable multivibrators 118 of the counter means 116 are sequentially triggered at timed intervals and the intervals are determined by the rotational speed of the rotating disc 90.

The display control circuit 86 further includes a plurality of driver means which, in the illustrated embodiment, are forty-eight in number to match the number of monostable multivibrators 118 of the electronic counter means 116. The driver means are, for convenience of this description, numbered D-1 through D-48. Each of the drivers are shown in the form of a transistor having a base terminal (B), collector terminal (C) and an emitter terminal (E).

The electroacoustic pulse signal from the electric circuit means 13 is connected to the base terminal (B) of each of the driver means D-1 through D-48 so that each pulse of the electroacoustic pulse signal will be simultaneously present on the base terminal (B) of all of the driver means. As seen, conductor C-1 is connected to the collector terminal (C) of driver means D-1, conductor C-2 is connected to the collector terminal (C) of the driver means D-2, and so forth.

As is well known, the transistors are non-conductive in the absence of a voltage on both the base and collector terminals thereof. Therefore, driver means D-1 will become conductive when a pulse of the electroacoustic pulse train is present on its base terminal, and monostable multivibrator No. 1 is producing an output signal that is applied to the collector terminal by conductor C-1. Thus, driver means D-1 will become conductive and an output signal will be applied on conductor L-1 that is connected to the emitter terminal (E) of the driver D-1. As is well known, monostable multivibrators when triggered will produce an output signal for a predetermined length of time and will automatically cease to produce that output signal after that time. Therefore, driver means D-1 will be conductive as long as the monostable multivibrator No. 1 is applying a voltage to the collector terminal (C) thereof and will return to its nonconductive state when monostable multivibrator No. 1 ceases to produce its output signal. By that time, however, monostable multivibrator No. 2 will have been triggered to apply a voltage on the collector terminal of driver means D-2 to render it conductive, assuming of course that an electroacoustic pulse from the threshold circuit 24 is present on the base terminal (B) of driver D-2.

In the above described manner, the drivers D-1 through D-48 will be sequentially rendered conductive and the output signals from the drivers D-1 through D-48 will be transmitted over the conductors L-1 through L-48, respectively, to the visual display means 84.

The visual display means 84, as seen best in FIG. 6, is in the preferred form of a stationary disc 120 having a plurality of indicator lights 122 mounted thereon in a circular array. Alternatively, the lights could be arranged in any desired manner such as in a linear array. In the illustrated embodiment, there are forty-eight lights and each of the conductors L-1 through L-48 are connected to a different one of the lights. In this manner, the indicator lights 122 will be sequentially illuminated in response to the sequential conduction of the driver means D-1 through D-48 and the timing is all controlled by the rotational speed of the disc 90 of the optical encoder means 88 and this results in synchronization of the operation of the apparatus 10a with the RPM of the engine being monitored.

When the engine being monitored is operating properly, e.g., not misfiring, the same set of indicator lights 122 will be repeatedly illuminated for repeated occurrences of combustion in the same cylinder. In other words, combustion in cylinder No. 1 will illuminate, for example, the first set of about twelve lights for a four cyinder engine, the next cylinder that fires will illuminate the next set of about twelve lights, and so forth. Whenever a misfire occurs, the appropriate set of lights will not be illuminated.

It is to be understood that the same basic objective could be accomplished for monitoring a four cylinder engine by using an optical encoder means that produces as few as four counter pulses, an electronic counter means that produces only four output signals, by using four driver means to sequentially illuminate four lights on the visual display device.

However, the use of multiple indicator lights 122 is preferred to provide other indications of engine performance. It will be appreciated that the electroacoustic pulses are not of square wave configuration but instead build up to a peak value and will attenuate from that peak. Thus, at the beginning of combustion, a relatively low voltage value will be applied to the base terminals of the driver means D-1 through D-48, and that voltage will build up to a peak and then fall off. As a result, the drivers which are sequentially rendered conductive, in the manner described above, will produce output signals having voltage values which vary in accordance with the voltage applied to their respective base terminals. In other words, when combustion starts, the first enabled driver will produce a low voltage ouput and the particular indicator light 122 which is coupled to that driver will glow faintly. The next light will be somewhat brigher, and so forth, until peak illumination is reached somewhere in the middle of the particular light set that responds to the particular cylinder that is firing in the engine being monitored. After peak illumination occurs, the sequentially illuminated lights of the light set will become progressively dimmer.

By providing structure which results in a build up and subsequent attenuation of light intensity in the visual display device 84, other engine performance characteristics can be monitored in addition to misfiring conditions. For example, operation of an automatic spark advance mechanism, a short or open circuit in the ignition system, and the like.

Figure 9:
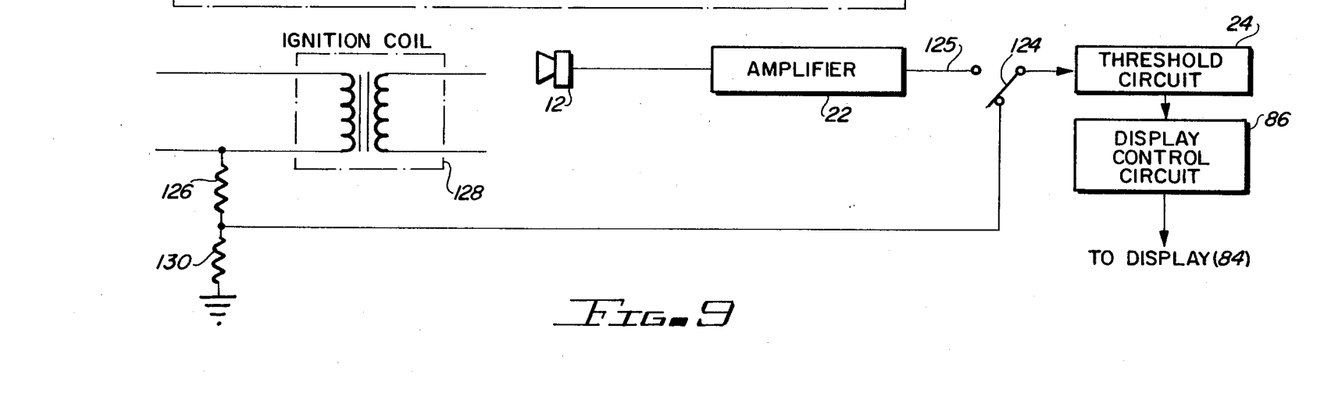
FIG. 9 is a fragmentary schematic diagram showing a modification of the second embodiment of the apparatus of the present invention.

As shown in FIG. 9, the above described second embodiment of the apparatus of the present invention may be modified to include means for selective monitoring of the ignition system of the engine being monitored, in addition to the above described monitoring operations. A selector switch 124 is provided in the conductor 125 between the amplifier 22 and the threshold circuit 24. In a first position (not illustrated) of the switch 124 the apparatus 80 will function in the above described manner for detecting misfiring and other related functions. In the illustrated position of switch 124, the electroacoustic pulse train is disconnected and an ignition system pulse train is supplied to the input of the threshold circuit 24 and subsequently to the display control circuit 86.

To provide the ignition system pulse train, a conductor 126 is connected to either the primary circuit or the secondary circuit of the engine's ignition system, such as by connecting to either side of the ignition coil 128. When connected in this manner, and the selector switch 124 is in the illustrated position, a pulse train indicative of each occurrence of a spark in the engine being monitored will be transmitted over the conductor 126 through a voltage divider circuit means 130, through the switch 124 to the threshold circuit 24. The ignition system pulse train will produce the same results in the display control circuit 86 as the hereinbefore described electroacoustic pulse train, that is, it will apply a voltage on the base terminals of the drivers D-1 through D-48.

While the principles of the invention have now been made clear in the illustrated embodiments, there will be immediately obvious to those skilled in the art, many modification of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. An apparatus for monitoring the operation of an internal combustion engine and providing a visual display indicative of the monitored operation, said apparatus comprising:
    (a) an electroacoustic transducer for sensing the acoustic pressure wave of the exhaust of the engine being monitored and providing an electroacoustic signal including a multiplicity of pulses each indicative of a different occurrence of combustion in the engine being monitored;
    (b) circuit means coupled to receive the electroacoustic signal from said transducer, said circuit means including amplifier circuit means for amplifying the received electroacoustic signal and threshold circuit means for removing spurious pulses from the electroacoustic signal;
    (c) visual display means coupled to receive the electroacoustic signal from said circuit means and respond thereto by producing a visual indication of the occurrence of each pulse in the received electroacoustic signal; and
    (d) synchronization means coupled to said visual display means for synchronizing the production of visual indications by said visual display means with the RPM of the engine being monitored.

2. An apparatus as claimed in claim 1 wherein said visual display means comprises:
    (a) a rotatably drivable disc;
    (b) an indicator light on said disc; and
    (c) connector means for coupling the electroacoustic signal from said circuit means to said indicator light for illumination of said indicator light upon receipt of each pulse in the electroacoustic signal.

3. An apparatus as claimed in claim 2 wherein said synchronization means comprises means for rotatably driving said disc at a speed which substantially matches the RPM of the engine being monitored.

4. An apparatus as claimed in claim 2 wherein said synchronization means comprises:
    (a) a variable speed electric motor having an output shaft upon which said disc is mounted for rotation; and
    (b) means in the power supply of said variable speed electric motor for adjustably varying the voltage supplied to said motor for adjusting rotational speed of said motor to match the RPM of the engine being monitored.

5. An apparatus as claimed in claim 2 wherein said synchronization means comprises:
    (a) a synchro generator for connection to a rotating element of the engine being monitored so that the rotating element provides a rotary input to said synchro generator which responds by producing an electric output signal indicative of the rotational input; and
    (b) a synchro motor having an output shaft upon which said disc is mounted for rotation, said synchro motor coupled to receive the electric output signal from said synchro generator and respond by rotationally driving its output shaft at the same speed as the rotary input to said synchro generator.

6. An apparatus as claimed in claim 1 and further comprising:
    (a) conductor means for connection to the ignition circuit of the engine being monitored for sensing and transmitting an ignition signal having a multiplicity of pulses each indicative of a different occurrence of a spark in the ignition system;
    (b) voltage divider means for receiving the ignition signal from said conductor means and reducing the voltage value thereof; and
    (c) switch means in said circuit means between the amplifier circuit means and the threshold circuit means thereof, said switch means being coupled to receive the ignition signal from said voltage divider means and the electroacoustic signal from said amplifier circuit means and operable for selective application of those signals to said threshold circuit means.

7. An apparatus as claimed in claim 1 wherein said visual display means includes a plurality of indicator lights.

8. An apparatus as claimed in claim 7 wherein said synchronization means comprises:
    (a) encoder means for placement proximate a rotating component of the engine being monitored for sensing the rotational speed thereof and producing an electric signal means having a frequency determined by the rotational speed of the rotating component;
    (b) counter means coupled to receive the electric signal means from said encoder means and respond by producing a plurality of output signals at a sequential rate corresponding to the frequency of the received electric signal means from said encoder means;
    (c) a plurality of driver means each coupled to receive the electroacoustic signal from said circuit means and each coupled to receive a different one of the output signals from said counter means, said plurality of driver means sequentially producing output signals with each of said driver means producing its output signal upon simultaneous receipt of the electroacoustic signal from said circuit means and its respective one of the output signals from said counter means; and (d) each of said plurality of driver means being coupled to transmit its output signal to a different one of said plurality of indicator lights for sequential illumination of said indicator lights.

9. An apparatus as claimed in claim 8 wherein said encoder means is an optical encoder.

10. An apparatus as claimed in claim 8 wherein said encoder means comprises:
(a) a disc for connection to the rotating component of the engine being monitored for rotational driving of said disc, said disc having a plurality of apertures disposed in a circular array therein; and
(b) optical sensing means producing the electric signal means of said encoder means, said optical sensing means being for fixed positioning relative to said disc and aligned with the circular array of apertures provided in said disc.

11. An apparatus as claimed in claim 8 wherein said encoder means comprises:
(a) a disc for connection to the rotating element of the engine being monitored for rotational driving of said disc, said disc having a plurality of apertures formed in a circular array therein and a different singular aperture formed therein in offset relationship with said circular array of apertures; and
(b) optical sensing means for fixed positioning relative to said disc for producing the electric signal means of said encoder means, said optical sensing means being adapted to provide said electric signal means with a plurality of counter pulses corresponding to the number of apertures in the circular array of said disc and to provide said electric signal means with a single timing pulse for each revolution of said disc.

12. An apparatus as claimed in claim 7 wherein said synchronization means comprises:
(a) encoder means for placement proximate a rotating element of the engine being monitored for sensing the rotational speed thereof and producing a first electric siginal having a frequency determined by the rotational speed of the rotating element of the engine and a second electric signal having one pulse per revolution of the rotating element of the engine being monitored;
(b) counter means coupled to receive the first and second electric signals from said encoder and responding by providing a plurality of output signals at a sequential rate corresponding to the frequency of the first electric signal from said encoder means, said counter means being reset upon receipt of the one pulse of said second electric signal from said encoder means;
(c) a plurality of driver means each coupled to receive the electroacoustic signal from said circuit means and each coupled to receive a different one of the output signals from said counter means, said plurality of driver means sequentially producing output signals with each of said driver means producing its output signal upon simultaneous receipt of the electroacoustic signal from said circuit means and its respective one of the output signals from said counter means; and
(d) each of said plurality of driver means being coupled to transmit its output signal to a different one of said plurality of indicator lights for sequential illumination of said indicator lights.

13. An apparatus as claimed in claim 12 wherein said encoder means is an optical encoder means.

14. An apparatus as claimed in claim 12 wherein said encoder means comprises:
(a) a disc for connection to the rotating element of the engine being monitored for rotational driving of said disc, said disc having a plurality of apertures formed in a circular array therein and having a different singular aperture formed therein in an offset relationship with said circular array of apertures;
(b) first optical sensing means for fixed positioning relative to said disc in alignment with the circular array of apertures of said disc for producing the first electric signal of said encoder means; and
(c) second optical sensing means for fixed positioning relative to said disc in alignment with the different singular aperture of said disc for producing the second electric signal of said encoder means.

15. An apparatus for monitoring the operation of an internal combustion engine and providing a visual display indicative of the monitored operation, said apparatus comprising:
(a) an electroacoustic transducer for sensing the acoustic pressure wave of the exhaust of the engine being monitored and producing an electroacoustic signal having a multiplicity of pulses each indicative of a different occurrence of combustion in the engine being monitored;
(b) amplifier circuit means coupled to receive the electroacoustic signal from said transducer and amplify the received signal;
(c) threshold circuit means coupled to receive the amplified electroacoustic signal from said amplifier circuit means for removing the spurious pulses from said electroacoustic signal;
(d) visual display means coupled to receive the electroacoustic signal from said threshold circuit means and respond thereto by producing a visual indication of the occurrence of each pulse in the received electroacoustic signal; and
(e) synchronization means coupled to said visual display means for synchronizing the production of the visual indications of said visual display means with the RPM of the engine being monitored.

16. An apparatus as claimed in claim 15 and further comprising:
(a) said visual display means including,
  I. a rotatable disc;
  II. an indicator light on said disc,
  III. connector means for coupling the electroacoustic signal from said threshold circuit means to said indicator light for illumination of said indication light upon receipt of each pulse in said electroacoustic signal; and
(b) said synchronization means including means for supporting said disc and rotatably driving said disc at a speed which substantially matches the RPM of the engine being monitored.

17. An apparatus as claimed in claim 15 and further comprising:
(a) said visual display means including a plurality of indicator lights; and
(b) said synchronization means including,
  I. encoder means for placement proximate a rotating element of the engine for sensing the rotational speed thereof and producing an electric signal indicative of the sensed speed, II. display control circuit means coupled to receive the electroacoustic signal from said threshold circuit means and the electric signal from said encoder means and using the latter of those signals for synchronizing the utilization of the former signal for sequential illumination of said indicator lights.

18. An apparatus as claimed in claim 15 and further comprising:
   (a) conductor means for connection to the ignition circuit of the engine being monitored for sensing and transmitting an ignition signal having a multiplicity of pulses each indicative of a different occurrence of a spark in the ignition system;
   (b) voltage divider means for receiving the ignition signal from said conductor means and reducing the voltage value thereof; and
   (c) switch means between said amplifier circuit means and said threshold circuit means, said switch means being coupled to receive the ignition signal from said voltage divider means and the electroacoustic signal from said amplifier circuit means and being operable for selective application of those signals to said threshold circuit means.

19. An apparatus for monitoring the operation of a spark-ignition internal combustion engine and producing a visual display indicative of the monitored operation, said apparatus comprising:
   (a) conductor means for connection to the ignition system of the engine being monitored to sense and transmit an ignition signal having a multiplicity of pulses each indicative of a different occurrence of a spark in the ignition system;
   (b) voltage divider means coupled to said conductor means for reducing the voltage of the ignition signal;
   (c) an electroacoustic transducer for sensing the acoustic pressure wave of the exhaust of the engine being monitored and producing an electroacoustic signal including a multiplicity of pulses each indicative of a different occurrence of combustion in the engine being monitored;
   (d) amplifier means coupled to receive the electroacoustic signals from said transducer and amplify the received signals;
   (e) switch means coupled to receive the ignition signal from said voltage divider means and the electroacoustic signal from said amplifier means;
   (f) threshold circuit means coupled to receive the ignition signal and the electroacoustic signal from said switch means for removing the spurious pulses from the received signal;
   (g) said switch means operable for selective application of the received ignition signal and the received electroacoustic signal to said threshold circuit means;
   (h) visual display means coupled to receive the signal from said threshold circuit means and respond thereto by producing a visual indication of the occurrence of each pulse in the received signal; and
   (i) synchronization means coupled to said visual display means for synchronizing the production of the visual indications by said visual display means with the RPM of the engine being monitored.

20. An apparatus as claimed in claim 19 and further comprising:
   (a) an electroacoustic transducer for sensing the acoustic pressure wave of the exhaust of the engine being monitored and producing and electroacoustic signal including a multiplicity of pulses each indicative of a different occurrence of combustion in the engine being monitored;
   (b) amplifier means coupled to receive the electroacoustic signals from said transducer and amplify the received signals; and
   (c) switch means coupled to receive the ignition signal from said voltage divider means and the electroacoustic signal from said amplifier means, said switch being coupled to the input of said threshold circuit means and being operable for selective application of those signals to said threshold circuit means.

* * * * *